(12) United States Patent
Neff

(10) Patent No.: US 6,772,791 B2
(45) Date of Patent: Aug. 10, 2004

(54) DIRECTLY OPERATED PNEUMATIC VALVE HAVING AN AIR ASSIST RETURN

(75) Inventor: Robert Neff, Bloomfield Village, MI (US)

(73) Assignee: MAC Valves, Inc., Wixom, MI (US)

( * ) Notice: Subject to any disclaimer, the term of this patent is extended or adjusted under 35 U.S.C. 154(b) by 77 days.

(21) Appl. No.: 10/150,291

(22) Filed: May 17, 2002

(65) Prior Publication Data

US 2003/0213523 A1 Nov. 20, 2003

(51) Int. Cl.⁷ .................................... F15B 13/044
(52) U.S. Cl. ........................... 137/625.65; 137/906
(58) Field of Search ................. 137/625.27, 625.65, 137/906

(56) References Cited

U.S. PATENT DOCUMENTS

| | | | |
|---|---|---|---|
| 2,618,244 A | 11/1952 | Roehm | 121/46.5 |
| 2,655,939 A | 10/1953 | Tauscher et al. | 137/623 |
| 2,709,421 A | 5/1955 | Avery | 121/41 |
| 2,953,123 A | 9/1960 | Reen et al. | 121/157 |
| 2,970,575 A | 2/1961 | Stern | 121/41 |
| 3,089,517 A | 5/1963 | Ludwig | 137/623 |
| 3,126,031 A | 3/1964 | Hayner | 137/625.62 |
| 3,706,322 A | * 12/1972 | Carlson | 137/625.66 |
| 4,187,884 A | * 2/1980 | Loveless | 137/906 |
| 4,215,723 A | 8/1980 | Ichiryu et al. | 137/625.63 |
| 4,257,572 A | * 3/1981 | Neff | 137/625.64 |
| 4,267,862 A | 5/1981 | Neff et al. | 137/625.64 |
| 4,271,868 A | * 6/1981 | Neff | 137/625.64 |
| 4,298,027 A | * 11/1981 | Neff | 137/906 |
| 4,453,565 A | 6/1984 | Neff | 137/596 |
| 4,462,427 A | 7/1984 | Neff | 137/625.64 |
| 4,465,100 A | 8/1984 | Neff | 137/625.64 |
| 4,485,846 A | 12/1984 | Neff | 137/625.64 |
| 4,553,732 A | 11/1985 | Brundage et al. | 251/30.01 |
| 4,574,844 A | 3/1986 | Neff et al. | 137/625.65 |
| 4,589,437 A | 5/1986 | Zeuner et al. | 137/117 |
| 4,649,957 A | * 3/1987 | Quinn | 137/906 |
| 5,092,365 A | 3/1992 | Neff | 137/625.65 |
| 5,136,774 A | 8/1992 | Neff | 29/602.1 |
| 5,192,936 A | 3/1993 | Neff et al. | 335/281 |
| 5,564,673 A | 10/1996 | Pieren | 251/30.03 |
| 5,666,994 A | 9/1997 | Stoll et al. | 137/625.64 |
| 6,021,997 A | 2/2000 | Hell | 251/30.04 |
| 6,192,937 B1 | 2/2001 | Fagerlie et al. | 137/625.63 |
| 6,328,275 B1 | 12/2001 | Yang et al. | 251/30.03 |

FOREIGN PATENT DOCUMENTS

| | | |
|---|---|---|
| EP | 0 353 965 | 7/1990 |
| JP | 5-231558 | 9/1993 |

* cited by examiner

Primary Examiner—Gerald A. Michalsky
(74) Attorney, Agent, or Firm—Bliss McGlynn, P.C.

(57) ABSTRACT

A direct operated valve assembly is provided including a valve body having a pressurized inlet port in communication with a source of pressurized air, a cylinder port, a valve bore extending axially within the valve body, and a valve member supported within the valve bore and movable between predetermined positions within the valve bore to selectively direct pressurized air from said inlet port through the cylinder port. An actuator is also included that is mounted to the valve body for moving the valve member in a first direction and a biasing member disposed between the valve member and the valve body to provide a biasing force to the valve member in an opposite direction. Also, an air-assist passage is included for providing a source of pneumatic pressure that acts in combination with the biasing member to operatively move the valve member in a direction opposite to the movement induced by the actuator.

23 Claims, 5 Drawing Sheets

DIRECTLY OPERATED PNEUMATIC VALVE HAVING AN AIR ASSIST RETURN

BACKGROUND OF THE INVENTION

1. Field of the Invention

The invention relates, generally, to pneumatic valve assemblies and, more specifically, to a directly operated pneumatic valve having an air assist return.

2. Description of the Related Art

Directly operated, or actuated, pneumatic valves are well known in the art for controlling the flow of pressurized air therethrough. Directly operated valves may be used alone or in connection with, for example, spool valves and regulators that, in turn, control the flow of pressurized air to and from various pneumatically actuated devices such as press clutches, air brakes, air cylinders or any other pneumatic device or application requiring precise control of operating air. More specifically, two-way, three-way and four-way direct operated valve assemblies are commonly employed in these environments. Such valves typically include a valve body having a valve bore formed in the valve body. A valve member is movably supported within the valve bore from one position to another in direct response to an operative force placed on the valve member by an actuator. A plurality of ports are used to connect the valve assembly to a system supply pressure as well as the various active devices that the valve may control. The actuator is typically an electromagnetically operated solenoid that is energized to move the valve member to a predetermined position within the valve bore. A return spring is often employed to bias the valve member back to a known non-energized position. Valves of this type are employed in a wide variety of manufacturing environments where a high flow rate and very fast response time are desired.

As the technology for these valves has advanced, there has been an increase in the demand for smaller valves that are designed to be employed in operating environments with ever decreasing physical dimensions. In addition, the advance in technology has dictated that the valves must be able to operate with very fast cycle times. In fact, the demand for greater speed and shorter response time is an ongoing requirement for valves of this type. However, in the past, certain design barriers have limited the extent to which the size of the valve assembly could be reduced while at the same time increasing its speed. When the valve member and the valve bore are reduced below a predetermined size, the return spring may be of insufficient physical size and mechanical strength to overcome the inertia of the valve member. In addition, after the valve member has been biased in one direction by the actuator, frictional forces and surface adhesion can build up at the interface of the valve member seals and the valve bore. These frictional forces and related surface adhesion can act to inhibit movement of the valve member in the opposite direction and reduce valve speed and therefore increase valve response time. In this case, the return spring may be unable to provide enough biasing force to quickly or effectively move the valve member from its energized position and return it to the non-energized position when the actuator force is removed. When this occurs, accurate control of the active device is lost. To counter this shortcoming, various design strategies have emerged. However, the design strategies that have been proposed in the related art all suffer from the disadvantage that they add supplemental mechanisms, hardware, or require a remote mounting of the valve.

For example, one design strategy proposed in the related art involves the use of dual electromagnetic actuators to move the valve member in opposite directions. Thus, the return spring is replaced by an electromagnetic actuator such as a solenoid. Unfortunately, this solution adds the complexity of a second solenoid and its associated parts, and also creates another size limiting boundary. On the other hand, single electromagnetic actuators that energize in both directions have been suggested in the related art. However, these single electromagnetic actuators require a bulkier double wound actuator as well as additional electronic circuitry and controls. Thus, directly operated valves that employ the bulkier single electromagnetic operators are typically mounted in a remote location relative to the pneumatically actuated device they control. Unfortunately, the remotely located valves defeat the purpose of smaller, lighter, and more accurate valve designs that can be mounted in very close proximity to the active devices. Also, they must be interconnected via conduits or other flow passages, which require additional hardware and plumbing, and can lower pneumatic efficiencies and introduce line losses within the system.

While the use of the larger conventional valves, either remotely disposed or with the addition of other components, has generally worked for their intended purposes, there remains an ongoing need in the art to simplify pneumatic systems and thereby lower costs of manufacture and/or assembly by creating ever smaller, yet highly accurate, fast actuating, directly operated pneumatic valves. Smaller directly operated valves can be located in very close proximity to active system components, thereby shortening flow paths, reducing or eliminating additional plumbing and hardware, and increasing pneumatic flow efficiency. Unfortunately, the design strategies that have been proposed in the related art have failed to overcome the problems created when the valve member and bore are reduced in size past the point where a return spring has the physical size and mechanical force to quickly, effectively, and repeatedly return the valve member of a fast acting valve to the non-energized position.

SUMMARY OF THE INVENTION

The present invention overcomes these design barriers and other disadvantages of the related art in a directly operated valve assembly. More specifically, the present invention is directed toward a directly operated valve assembly including a valve body having a pressurized air supply inlet port in communication with a source of pressurized air, and at least one cylinder port. A valve bore extends axially within the valve body, and a valve member is moveably supported within the valve bore between predetermined positions to selectively direct pressurized air from the inlet port through the cylinder port. An actuator is mounted to the valve body for moving the valve member in a first direction and a biasing member is disposed between the valve member and the valve body to provide a biasing force to the valve member in an opposite direction. Also, an air-assist passage is included for providing a source of pneumatic pressure that acts in combination with the biasing member to operatively move the valve member in a direction opposite to the movement induced by the actuator.

The directly operated valve assembly of the present invention has distinct advantages over the valves known in the related art. The air-assist passage provides a source of pneumatic pressure from the pressurized cylinder port that acts in combination with the biasing member to operatively move the valve member in a direction opposite to the movement induced by the actuator. Importantly, the air assist facilitates a faster acting valve. More specifically, valve assemblies employing the air assist of the present invention may include a smaller biasing member that generates less force than would be required without the air assist. Because the biasing member generates less force, the actuator has less force to overcome and therefore moves the valve member to its first position faster. In addition, the biasing member, along with the air assist provided through the passage, will be able to quickly and efficiently move the valve member away from its second, or energized, position once the solenoid assembly is de-energized. The air-assist passage provides the necessary mechanical impetus to assist in moving the valve member to the de-energized position.

Thus, the directly operated valve assembly of the present invention overcomes the shortcoming and drawbacks of conventional valve assemblies when they are so reduced in size such that the biasing member alone is of insufficient physical size and mechanical strength to repeatedly, quickly, and efficiently overcome the inertia of the valve member and/or exceed the frictional adhesion forces acting at the valve bore. This allows a very fast acting valve assembly to be constructed in sizes below the conventional standards.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE
PREFERRED EMBODIMENT(S)

Figure 1:
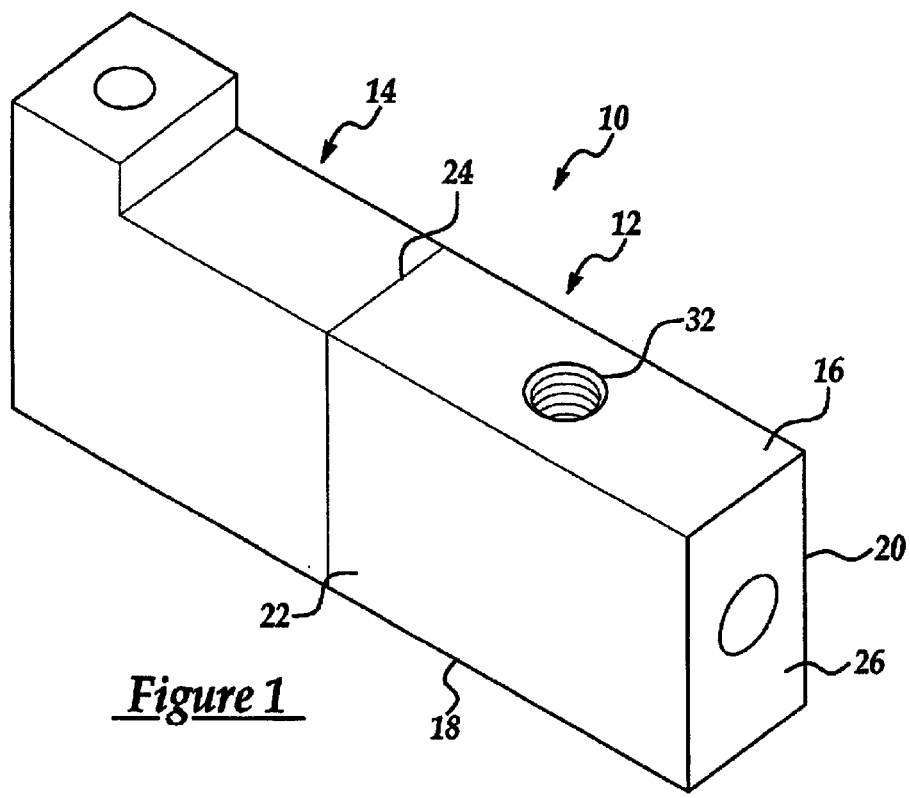
FIG. 1 is a perspective view of a directly operated valve assembly having an air assist return of the present invention.
Figure 2:
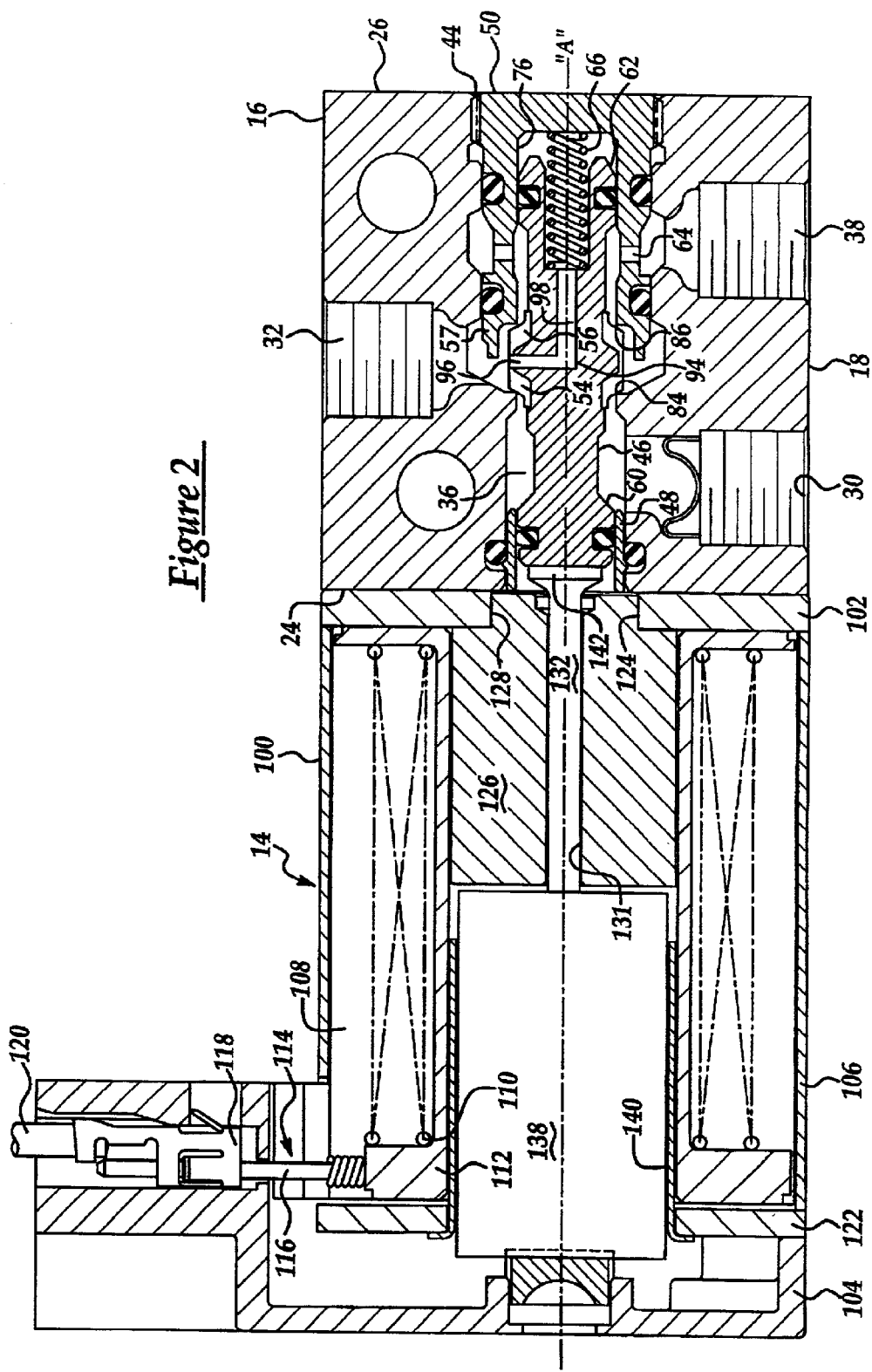
FIG. 2 is a cross-sectional side view of a directly operated valve assembly shown in FIG. 1 illustrating the position of the valve member when the solenoid is de-energized.
Figure 3:
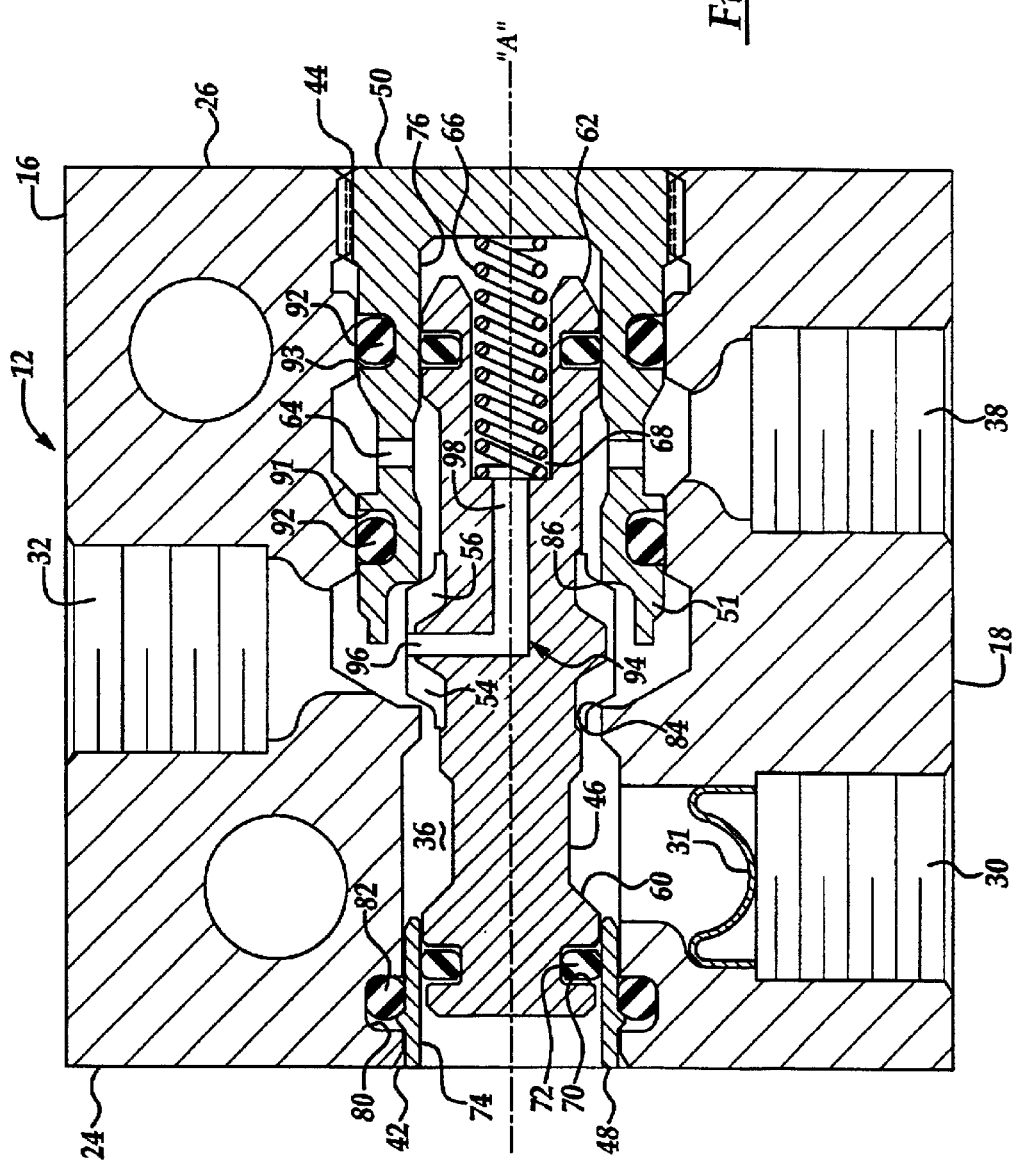
FIG. 3 is a partial cross-sectional side view of a directly operated valve assembly illustrating the position of the valve member when the solenoid is energized.

Referring now to the figures where like numerals are used to designate like structure throughout the drawings, one embodiment of a directly operated valve assembly of the present invention is generally indicated at 10 in FIGS. 1–3. The valve assembly 10 includes a valve body 12 and an electromagnetic actuator, generally indicated at 14, mounted to the valve body 12. The valve body 12 has a thin rectangular shape defining top and bottom surfaces 16, 18, respectively, a pair of opposed side surfaces 20, 22 extending between the top and bottom surfaces 16 and 18 and end surfaces 24,26. The actuator, shown as solenoid assembly 14, is mounted to the end surface 24 of the valve body 12.

Referring now to FIGS. 2 and 3, the valve body 12 includes a pressurized fluid inlet port 30 for communicating with a source of pressurized fluid, such as air. Furthermore, the valve body 12 includes at least one cylinder port 32. A valve bore 36 extends axially through the valve body 12. In the embodiment illustrated in FIGS. 1–3, the directly operated valve assembly 10 is a three-way valve and includes at least one cylinder port 32, and at least one exhaust port 38 each in fluid communication with the valve bore 36. In this embodiment, the cylinder port 32 is formed through the top surface 16 of the valve body 12 opposite the inlet port 30 and the exhaust port 38 is formed through the bottom surface 18. However, those having ordinary skill in the art will appreciate that the various ports may be formed through various, different, surfaces of the valve body 12. For example, these ports and passages may all be formed through one surface, such as the bottom 18 of the valve body 12, without departing from the scope of the invention. The inlet port 30, exhaust and cylinder ports 38 and 32, respectively may also be threaded to accommodate any mechanism necessary to establish fluid communication with another component that is operatively associated with the valve assembly 10. To this end, the valve body 12 is adapted to be mounted to a manifold, sub-base, or any of a number of various pneumatically actuated devices (not shown).

As shown in FIGS. 2–3, the valve bore 36 extends completely through the valve body 12 to present a pair of open ends 42, 44. A valve member, generally indicated at 46, is movable between predetermined positions within the valve bore 36 to selectively direct pressurized air from the inlet port 30 through the cylinder port 32 and the exhaust port 38 as will be described in greater detail below. A pair of end retainers 48 and 50 are received in the pair of open ends 42, 44, respectively, of the valve body 12 and act to retain the valve member 46 within the valve bore 36 as will be described in greater detail below.

The valve member 46 further includes a pair of opposed valve heads 60 and 62 disposed at either end of the valve member 46 and at least one valve element 54, 56 that is formed on the valve member 46 between the opposed valve heads 60, 62. The valve element 54, 56 is operable to selectively direct a flow of pressurized air from the inlet port 30 through the valve bore 36 to either the cylinder port 32 or exhaust port 38. Each of the end retainers 48, 50 has a central bore 74, 76, respectively, that receives opposite heads 60, 62 of the valve member 46 and allows the valve member to slidingly move within the valve body 12. As best shown in FIG. 3, the valve member 46 includes annular grooves 70 that receive o-ring type seals 72 which slidingly engage the central bore openings 74, 76, respectively, defined in the end retainers 48, 50 to prevent leakage of pressurized air within the valve bore 36. In one embodiment, the valve member 46 may be a poppet valve that is supported within the valve bore 36 for reciprocal movement therein to control the flow of fluid through the valve body 12. In this case, the poppet valve member 46 is preferably an aluminum insert over molded and bonded with rubber in specific areas of the valve member 46 and ground to specific dimensions to form, for example, the valve elements 54, 56. However, from the description that follows, those having ordinary skill in the art will appreciate that the present invention is not limited in any way to use in connection with a poppet valve. Rather, the present invention may be employed in connection with any other directly operated valve including, but not limited to, for example, spool valves, flat rubber poppet valves, flapper valves, pilot valves, or valve assemblies employed adjacent to or remote from the pneumatically actuated device.

The end retainer 50 is cup-shaped and includes a plurality of cylinder passages 64 defined in the end retainer 50 and spaced radially relative to one another. The cylinder passages 64 provide fluid communication between the valve bore 36 and the respective adjacent ports. A biasing member 66 is positioned between the end retainer 50 and a recess 68 formed in one of the opposed valve heads 62 of the valve member 46. In the preferred embodiment, the biasing member is a coiled spring 66. However, those having ordinary skill in the art will appreciate that any biasing mechanism commonly known in the art that is sufficient to provide a force in one direction may be suitable for use in this application. Furthermore, those having ordinary skill in the art will appreciate that, because of the sheer number of suitable biasing members that may be employed in this environment, it is not efficient to attempt to catalog all of them here. Rather, it should be sufficient for purposes of description and illustration to mention that the return spring 66 applies a constant biasing force against the valve member 46 and to the left as viewed in FIGS. 2 and 3. Furthermore, the same is true with respect to the other embodiments described with respect to FIGS. 4–6 of the present application.

A plurality of valve seats 84, 86 are presented in the valve bore 36. The valve seats 84 and 86 cooperate with the valve elements 54, 56 to seal the various passages in the valve body 12 as will be described in greater detail below. The valve seats 84, 86 provide sealing contact with the valve sealing surfaces of the valve elements 54, 56 when the valve member 46 is in a closed position relative to a particular port thereby interrupting the flow of pressurized air in that port.

At least one of the valve seats, and in this case valve seat 84, may be formed directly on the valve bore 36 itself. The other valve seat 86 may be defined near the terminal end 51 of the end retainer 48 or 50. In the embodiment illustrated in FIGS. 2 and 3, the valve seat 86 is disposed upon the terminal end 51 of the retainer 50. The end retainer 50 is threadably adjustable within the valve bore 36 of the valve body 12 and therefore maybe adjustably positioned within the end 44 of the valve bore 36. Thus, the threadably set position of the end retainer 50 within the valve body 12 controls the sealing of the valve seats 84, 86 with a given force applied to the valve member 46. The position to which the terminal end 51 of the end retainer 50 is located within the valve bore 36 defines the predetermined "open" and "closed" positions of the valve assembly 10 and thereby sets the stroke length of the valve member 46. To prevent leakage of the pressurized air within the valve bore 36, the end retainer 50 further includes annular grooves 91 and 93 that receive o-ring type seals 92, and the valve body 12, at the end retainer 48, further includes an annular groove 80 that receives an o-ring type seal 82.

As noted above and illustrated in FIGS. 1–3, the electromagnetic actuator 14 is a solenoid assembly mounted to the end surface 24 of the valve body 12. The poppet valve member 46 is actuated in one direction, or to the right as viewed in FIG. 2, under the influence of the solenoid assembly 14. To this end, the solenoid assembly 14 includes a housing, generally indicated at 100. The housing 100 includes a pole plate 102 abutting the valve body 12, a cap 104 disposed opposite the pole plate 102 and a solenoid can or frame 106 extending therebetween. The frame 106 supports a coil 108 including a conductive wire, schematically indicated at 110, conventionally wrapped around a bobbin 112. The conductive wire 110 is connected to a source of electrical current through leads, generally indicated at 114. The leads 114 are supported in the cap 104 and include lead pins 116, electrical contacts 118 and lead wires 120. The lead wires 120 are operatively connected to a source of electrical current. The direction of the current through the coil 108 and thus the direction of the electromagnetic force generated thereby is controlled by a control circuit (not shown). A top plate 122 is mounted adjacent to the bobbin 112 and between a portion of the frame 106 and the cap 104.

The pole plate 102 includes an opening 124 extending therethrough. The solenoid assembly 14 further includes a ferromagnetic pole piece 126 having a stepped portion 128 with a smaller cross-sectional area than the rest of the pole piece 126. The stepped portion 128 is received in the opening 124 of the pole plate 102 for mechanically fixing the pole piece 126 to the pole plate 102. A centrally located passage 131 extends through the pole piece 126. A pushpin 132 is movably supported in the passage 131.

A ferromagnetic armature 138 is disposed between the cap 104 and the pole piece 126. A bushing 140 guides the armature 138 within the bobbin 112. The armature 138 is movable toward the pole piece 126 under the influence of an electromagnetic flux generated by a pulse of current flowing through the coil 108 in one direction. This flux drives the armature 138 against the pushpin 132 to move the valve member 46 to the right as viewed in FIGS. 2–3 and to one predetermined position. Furthermore, the armature 138 is movable away from the pole piece 126 and toward the cap 104 (to the left as viewed in the Figures) under the influence of a force generated in the opposite direction as will be described in greater detail below.

To this end, the pushpin 132 presents an enlarged head 142 which is disposed adjacent one end of the poppet valve member 46 for contacting it when the armature 138 contacts the pushpin 132.

Figure 4:
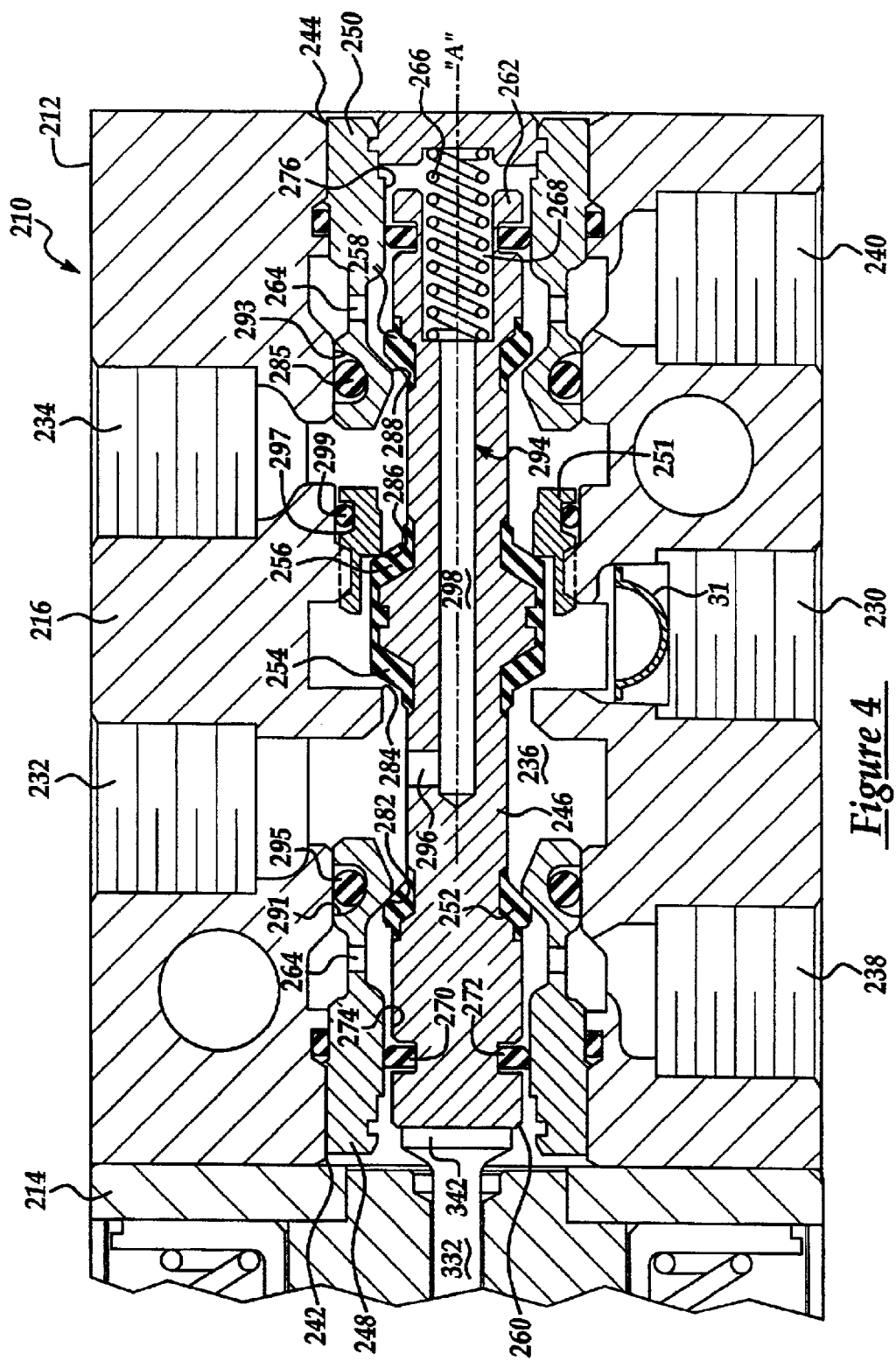
FIG. 4 is a partial cross-sectional side view of another embodiment of a directly operated valve assembly of the present invention illustrating the position of the valve member when the solenoid is de-energized.
Figure 5:
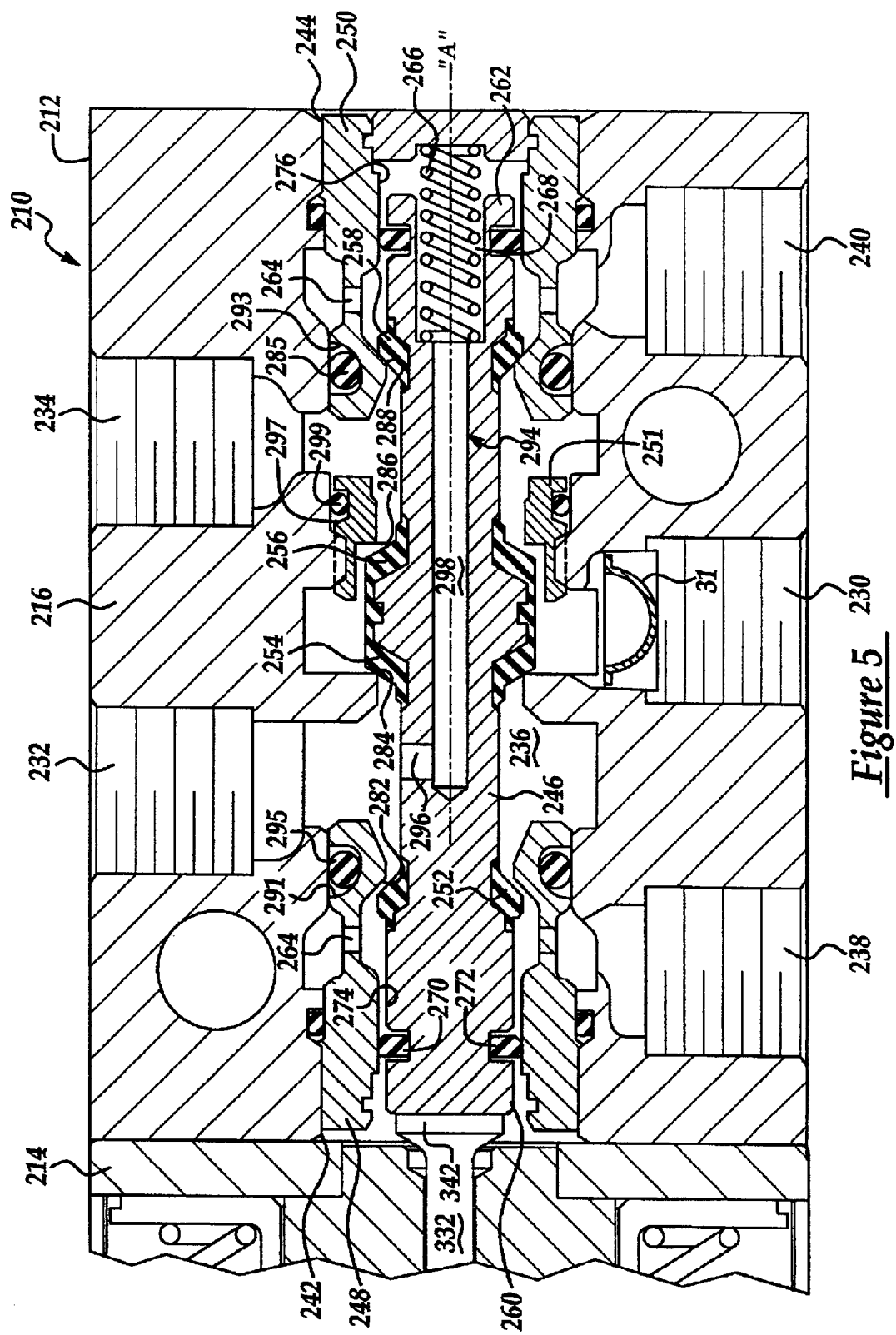
FIG. 5 is a partial cross-sectional side view of the directly operated valve assembly shown in FIG. 4 illustrating the position of the valve member when the solenoid is energized.

While a particular electromagnetically actuated device has been described above, the actuator employed with the valve assembly of the present invention may be of any known type used in pneumatic valves such as a self-latching electromagnetic solenoid of the type described in U.S. Pat. No. 6,129,115 issued on Oct. 10, 2000. Alternatively, the actuator may be an electromagnetic solenoid having a floating armature with lost-motion biasing such as described in prior art U.S. Pat. Nos. 4,438,418 or 3,538,954. Each of these patents are assigned to the assignee of the present invention and the disclosures of these patents are incorporated herein by reference. Thus, those having ordinary skill in the art will appreciate from the description that follows that the exact form of the actuator, whether electromagnetic or otherwise, forms no part of the present invention. It should be further appreciated from the description of the invention that follows that, although the preferred embodiment of the pneumatic valve assembly 10 of the present invention is depicted as a three-way valve in FIGS. 1–3, the present invention may also be alternately embodied in the form of a two-way valve (not shown), a four-way valve (as shown in FIGS. 4–5), or the like.

When the valve member 46 has been moved by the solenoid assembly 14 to the right as illustrated in FIG. 3, the valve element 56 is moved into sealing engagement with the valve seat 86 defined on the terminal end 51 of the end retainer 50. In this operative disposition, fluid communication between the inlet port 30 and the cylinder port 32 is established and pneumatic pressure may be delivered to any down stream device. However, when the valve member 46 is in this operative disposition, frictional and adhesive forces may be generated at the interface between the valve member 46 and the central bore openings 74, 76 of the end retainers 48, 50. These forces act to resist the biasing force generated in the opposite direction by the biasing member 66 once the solenoid assembly 14 has been de-energized. Thus, these forces act to degrade the speed and efficiency at which the valve member 46 is returned to its first position. In addition, a reduction in the size of the biasing member 66 may result in a reduction of the force generated thereby resulting in a slower valve response time.

In order to overcome this problem, the valve assembly 10 of the present invention includes an air-assist passage, generally indicated at 94. In the embodiment illustrated in FIGS. 1–3, the air assist passage 94 is formed within the valve member 46 and provides fluid communication between at least one cylinder port 32 and the recess 68 in the valve head 62 of the valve member 46. Thus, the air assist passage 94 provides selective fluid communication between the source of pressurized air and the recess 68. More specifically, and as illustrated in FIGS. 2 and 3, the air assist passage 94 includes an inlet portion 96 and a main passage 98. The inlet portion 96 extends radially relative to the centerline "A" of the valve member. In this representative embodiment, the inlet portion 96 is formed between valve elements 54, 56 and between the valve seats 84, 86 defined in the valve bore 36. The main passage 98 provides fluid communication between the inlet portion 96 and the recess 68. In this representative embodiment, the main passage 98 is coaxial relative to the longitudinal axis A of the valve member.

The air-assist passage 94 provides a source of pneumatic pressure from the pressurized cylinder port 32 that acts in combination with the biasing member 66 to operatively move the valve member 46 in a direction opposite to the movement induced by the actuator 14. Importantly, the air assist facilitates a faster acting valve. More specifically, a valve assembly 10 employing the air assist of the present invention may include a smaller biasing member 66 that generates less force than would be required without the air assist. Because the biasing member 66 generates less force, the actuator 14 has less force to overcome and therefore moves the valve member 46 to its first position faster. In addition, the biasing member 66, along with the air assist provided through the passage 94, will be able to quickly and efficiently move the valve member 46 away from its second, or energized, position once the solenoid assembly 14 is de-energized. The air-assist passage 94 provides the necessary mechanical impetus to assist in moving the valve member 46 to the de-energized position.

Thus, the directly operated valve assembly of the present invention overcomes the shortcoming and drawbacks of conventional valve assemblies when they are so reduced in size such that the biasing member 66 alone is of insufficient physical size and mechanical strength to repeatedly, quickly, and efficiently overcome the inertia of the valve member 46 and/or exceed the frictional adhesion forces acting at the interface between the valve member 46 and the central bore openings 74 and 76 of the end retainer 48, 50. This allows a very fast acting valve assembly 10 to be constructed in sizes below the conventional standards.

Referring now to FIGS. 4–5, an alternate, non-limiting embodiment of a directly operated valve assembly having an air assist return of the present invention is generally indicated at 210, where like numerals increased by 200 with respect to the embodiment illustrated in FIGS. 1–3 are used to designate like structure. The valve assembly 210 illustrated in FIGS. 4 and 5 includes a valve body 212 having a pressurized fluid inlet port 230 for communicating with a source of pressurized fluid, such as air. Furthermore, the valve body 212 includes at least one cylinder passage, or outlet port 232, that is adapted for fluid communication with one or more pneumatically actuated devices. A valve bore 236 extends axially through the valve body 212. In the embodiment illustrated here, the pneumatic valve assembly 210 is a four-way valve and includes a pair of outlet ports 232, 234 and a pair of exhaust ports 238, 240 each in fluid communication with the valve bore 236. The outlet ports 232, 234 are formed through the top surface 216 of the valve body 212 opposite the inlet port 230 and exhaust ports 238, 240, which are formed through the bottom surface 218. However, those having ordinary skill in the art will appreciate that the inlet port 230, outlet and exhaust ports 232, 234 and 238,240, respectively, maybe formed through the various surfaces of the valve body 212. For example, these ports may all be formed through one surface, such as the bottom 218 of the valve body 212, without departing from the scope of the invention. The inlet port 230, outlet and exhaust ports 232, 234 and 238, 240, respectively may also be threaded to accommodate any mechanism necessary to establish fluid communication with another element that is operatively associated with the valve assembly 210.

In the preferred embodiment illustrated in FIGS. 4–5, the valve bore 236 may extend completely through the valve body 212 to present a pair of open ends 242, 244. A valve member, generally indicated at 246, is movably supported within the valve bore 236 between predetermined positions to selectively direct a flow of pressurized air from the inlet port 230 through the valve bore 236 to at least one of the outlet ports 232, 234. Concomitantly, the valve member 246 may also selectively direct pressurized air to vent from at least one of the outlet ports 232, 234 to at least one of the exhaust ports 238, 240, as will be described in greater detail below. A pair of end retainer inserts, generally indicated at 248 and 250, are received in the pair of open ends 242, 244 of the valve body 212, thereby retaining the valve member 246 within the valve bore 236 as will be described in greater detail below. Similarly, the valve assembly 210 may include one or more inner retainers that are threadably positioned within the valve bore 236. In the embodiment illustrated herein, the valve assembly 210 includes one inner retainer 251 that is threadably positionable within the valve bore 236 as will be described in greater detail below.

The valve member 246 further includes a pair of opposed valve heads 260, 262 disposed at either end of the valve member 246 and at least one valve element formed on the valve member 246 between the valve heads 260, 262. In the specific embodiment illustrated in FIGS. 4 and 5, a plurality of valve elements 252, 254, 256, and 258 are formed on the valve member 246 and are each operable to selectively direct a flow of pressurized air from an inlet port 230 through the valve bore 236 to the respective outlet ports 238, 240. As shown in FIGS. 4 and 5, the valve member 246 further includes annular grooves 270 that receive o-ring type seals 272, which slidingly engage the central bore openings 274, 276 respectively, of the retainer inserts 248, 250 to prevent leakage of the pressurized air within the valve bore 236. In the preferred embodiment, the valve member 246 is an aluminum insert that is over-molded with a suitable resilient material such as rubber, or any known elastomer, in the appropriate places. More specifically, it should be appreciated by those having ordinary skill in the art that the material of the sealing surface may be made of any known composition that is slightly yielding, yet highly resilient, such as nitrile, which may be bonded, or over-molded to the valve element 246. However, from the description that follows, those having ordinary skill in the art will appreciate that the present invention is not limited in any way to use in connection with the specific valve illustrated in FIGS. 4–5.

Rather, the present invention may be employed in connection with any other directly operated valve including, but not limited to, for example, spool valves, flat rubber poppet valves, flapper valves, pilot valves, or valve assemblies employed adjacent to or remote from the pneumatically actuated device.

The end retainer inserts 248 and 250 each include a plurality of cylinder passages 264 defined in the diameter of the retainers that spaced radially relative to one another. The cylinder passages 264 provide fluid communication between the valve bore 236 and the respective adjacent ports. A biasing member 266, such as a coiled spring, is positioned between the cup-shaped end retainer insert 250 and a recess 268 formed in one of the opposed valve heads 262 of the valve member 246. The return spring 266 applies a constant biasing force against the valve member 246 and to the left as viewed in FIGS. 4 and 5.

A plurality of valve seats 282, 284, 286, and 288 are presented in the valve bore 236. The valve seats 282, 284, 286, and 288 cooperate with the valve elements 252, 254, 256, and 258, respectively, to seal the various passages in the valve body 212 as will be discussed in greater detail below. The valve seats 282, 284, 286, and 288 provide a sealing contact with the valve sealing surfaces of the valve elements 252, 254, 256, and 258 when the valve member 246 is in a closed position, relative to a particular outlet port, thereby interrupting the flow of pressurized air to that port.

Of the plurality of valve seats 282, 284, 286, and 288 shown in FIGS. 4 and 5, some may be formed directly in the valve bore 236 itself, as in the case of valve seat 284, while others (e.g., valve seats 282, 286, and 288) may be disposed upon the end retainer inserts 248, 250 and inner retainer 251. The retainer inserts 248, 250, and 251 may be adjustably positioned within the valve bore 236 of the valve body 212, having a threadable interaction with the ends 242, 244 or any other suitable portion of the valve bore 236. As discussed above, each of the retainer inserts 248, 250 has a central bore 274, 276 that receives the opposed heads 260, 262 of the valve member 246 and allows it to slidingly move within the valve body 212. Thus, the threadably set position of the end retainer inserts 248, 250 within the valve body 212 controls the sealing of the valve seats with a given force applied to the valve member 246. The end retainer inserts 248, 250 further include annular grooves 291 and 293 which receive o-ring type seals 295 to prevent leakage of the pressurized air within the valve bore 236. On the other hand, the positions to which the inner retainer insert 251 is threadably set defines the predetermined "open" and "closed" positions of the valve assembly 210 and thereby sets the stroke length of the valve member 246. And like the end retainer inserts, the inner retainer 251 may also include an annular groove 297 which is adapted to receive an o-ring type seal 299 so as to prevent leakage of the pressurized air within the valve bore 236.

In the preferred embodiment, the central bore 274 of retainer insert 248, which receives the end 260 of the valve member 246 also extends fully through the retainer allowing the actuator assembly 214 to engage and thereby actuate the valve member 246. As shown for illustration purposes only, this may be accomplished by the use of an actuator pushpin 332 having an enlarged head 342 that extends into the retainer insert 248 to engage and actuate the valve member 246. As alluded to above, it should be appreciated by those of ordinary skill in the art that the specific actuating means used to provide motive force to the valve member 246 lies beyond the scope of the present invention. Accordingly, it should be further appreciated that any number of different types of actuating elements, rather than a push pin, may be employed based on the actuating means used. The actuator assembly 214, as previously mentioned, is used to selectively actuate the valve member 246 within the valve bore 236 in the direction opposite to the biasing force of the biasing member 266. In this manner, the actuator assembly 214 drives the valve member to the right, as shown in FIG. 4, and the biasing member 266 returns the valve member 246 to its original position (to the left, in FIG. 5) when the actuator assembly 214 is deactivated.

When the valve member 246 has been moved by the solenoid assembly 214 to the right as illustrated in FIG. 4, the valve element 256 is moved into sealing engagement with the valve seat 286 defined on the inner retainer 251. In this operative disposition, fluid communication between the inlet port 230 and the cylinder port 232 is established and pneumatic pressure may be delivered to any down stream device. However, when the valve member 246 is in this operative disposition, frictional and adhesive forces may be generated at the interface between the valve element 256 and valve seat 286. These forces act to resist the biasing force generated in the opposite direction by the biasing member 266 once the solenoid assembly 214 has been de-energized. Thus, these forces act to degrade the speed and efficiency at which the valve member 246 is returned to its first position.

In order to overcome this problem, an air-assist passage, generally indicated at 294, is formed within the valve member 246 and extends between at least one cylinder port 232 and the recess 268 in the valve head 262 of the valve member 246 to provide selective fluid communication between the source of pressurized air and the recess 294. More specifically, and as illustrated in FIGS. 4 and 5, the air assist passage 294 includes an inlet portion 296 and a main passage 298. The inlet portion 296 extends radially relative to the centerline A of the valve member. In this representative embodiment, the inlet portion 296 is formed between a pair of valve elements 252, 254. The main passage 298 provides fluid communication between the inlet portion 296 and the recess 268 formed in the head 262 of the valve member 246. In this representative embodiment, the main passage 298 is coaxial relative to the longitudinal axis A of the valve member 246.

The air-assist passage 294 provides a source of pneumatic pressure from the pressurized cylinder port 232 that acts in combination with the biasing member 266 to operatively move the valve member 246 in a direction opposite to the movement induced by the actuator 214. Importantly, the air assist facilitates a faster acting valve. More specifically, the valve assembly 210 employing the air assist of the present invention may include a smaller biasing member 266 that generates less force than would be required without the air assist. Because the biasing member 266 generates less force, the actuator 214 has less force to overcome and therefore moves the valve member 246 to its first position faster. In addition, the biasing member 266, along with the air assist provided through the passage 294, will be able to quickly and efficiently move the valve member 246 away from its second, or energized, position once the solenoid assembly 214 is de-energized. The air-assist passage 294 provides the necessary mechanical impetus to assist in moving the valve member 246 to the de-energized position.

Thus, the directly operated valve assembly of the present invention overcomes the shortcoming and drawbacks of conventional valve assemblies when they are so reduced in size such that the biasing member 266 alone is of insufficient physical size and mechanical strength to repeatedly, quickly, and efficiently overcome the inertia of the valve member 246 and/or exceed the frictional adhesion forces acting at the interface of the valve member 246 and the central bore openings 274 and 276 of the end retainer inserts 248, 250. This allows a very fast acting valve assembly 210 to be constructed in sizes below the conventional standards.

Figure 6:
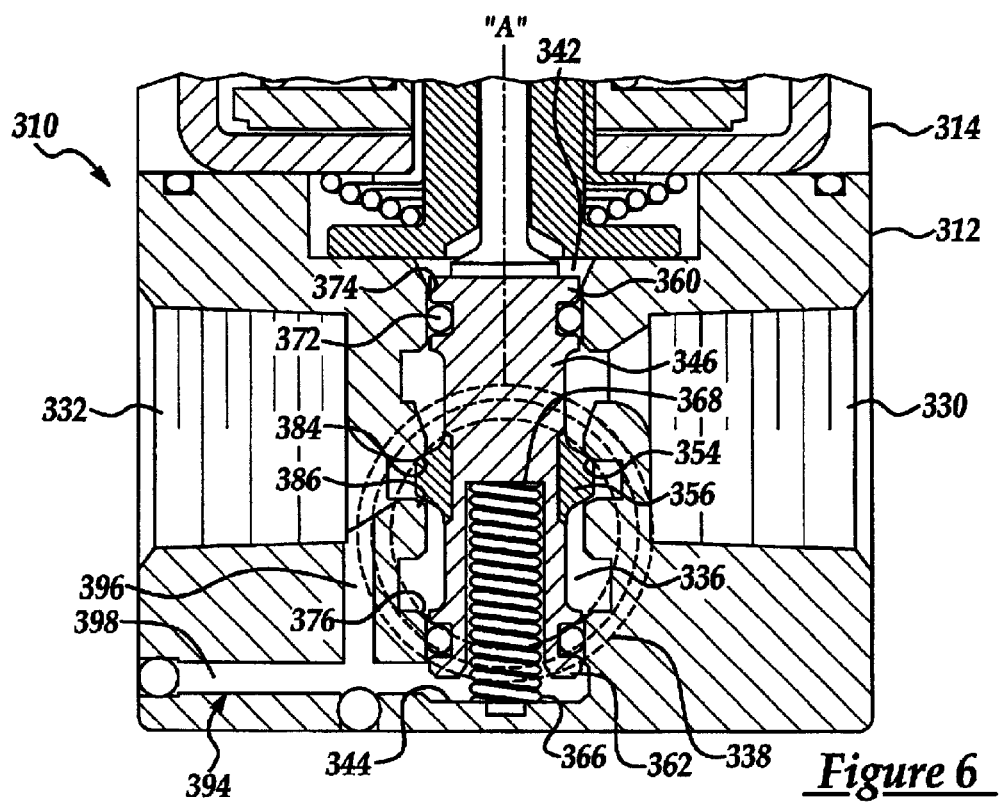
FIG. 6 is a partial cross-sectional side view of still another embodiment of a directly operated valve assembly of the present invention illustrating the position of the valve member when the solenoid is de-energized.

Referring now to FIG. 6, another, alternate non-limiting embodiment of a directly operated valve assembly having an air assist return of the present invention is generally indicated at 310, where like numerals increased by 300 with respect to the embodiment illustrated in FIGS. 1–3 are used to designate like parts. More specifically, the valve assembly 310 illustrated here is also a three-way valve and includes many of the same or similar components of the type described in connection with the three- and four-way valves illustrated in FIGS. 1–5. Accordingly, those having ordinary skill in the art will appreciate that the following description is presented in such away so as to highlight the salient features of the present invention and does not include a restatement of the discussion of all like components of the valve assembly of the type described above.

With this in mind, the valve assembly 310 includes a valve body 312 having a pressurized fluid inlet port 330 for communicating with a source of pressurized fluid, such as air. A valve bore 336 extends axially within the valve body 312. The valve body 312 also includes a cylinder port 332 and an exhaust port 338 both in fluid communication with the valve bore 336. A valve member 346 is moveably supported within the valve bore 336 and has a pair of opposed heads 360, 362. In addition, the valve member 346 includes at least one valve element 354, 356 that is operable to selectively direct a flow of pressurized air from the inlet port 330 through the valve bore 336 to either the cylinder port 332 or the exhaust port 338. A plurality of valve seats 384, 386 are presented in the valve bore 336. The valve seats 384 and 386 cooperate with the valve element 354, 356 to seal the various passages in the valve body 312 as will be described in greater detail below. The valve seats 384, 386 provide sealing contact with the valve sealing surfaces of the valve elements 354, 356 when the valve member 346 is in a closed position relative to a particular port thereby interrupting the flow of pressurized air in that port.

Unlike the open ended valve bores illustrated in FIGS. 1–5, the valve bore 336 is a blind bore having an open end 342 and a closed end 344. An electromagnetic actuator, such as a solenoid assembly, generally indicated at 314, is mounted to the valve body 312 at the open end 342 of the valve bore 336. The solenoid assembly 14 acts to bias the valve member 346 in one direction in the same manner as described with respect to the embodiments illustrated in FIGS. 1–5. On the other hand, a biasing member 366, such as a coiled spring, is positioned between the blind end 344 of the valve bore 336 and a recess 368 formed in one of the opposed valve heads 362 of the valve member 346. The return spring 366 applies a constant biasing force against the valve member 346 in a direction opposite to the force applied by the solenoid assembly 314.

When the valve member 346 has been moved by the solenoid assembly 314 downwardly, relative to FIG. 6, the valve element 356 is moved into sealing engagement with the valve seat 386 defined in the valve bore 336. In this operative disposition, fluid communication between the inlet port 330 and the cylinder port 332 is established and pneumatic pressure may be delivered to any downstream device. However, when the valve member 346 is in this operative disposition, frictional and adhesive forces may be generated at the interface between the seals 372 on the valve member 246 and the ends 342, 344 of the central bore 336. These forces act to resist the biasing force generated in the opposite direction by the biasing member 366 once the solenoid assembly 314 has been de-energized. As noted above, these forces act to degrade the speed and efficiency at which the valve member 346 is returned to its first position.

In order to overcome this problem, an air assist passage, generally indicated at 394, is formed within the valve body 312 and provides fluid communication between the cylinder port 332 and the recess 368 in the valve head 362 of the valve member 346. Thus, the air assist passage 394 provides selective fluid communication between the source of pressurized air and the recess 368. However, those having ordinary skill in the art will note that the air assist passage 394 differs from the air assist passages 94 and 294 in that it is defined within the valve body 312 as opposed to the valve member 46, 246. More specifically, and as illustrated in FIG. 6, the air assist passage 394 includes an inlet portion 396 and a main passage 398. The inlet portion 396 extends axially within the valve body 312 relative to the movement of the valve member 346 and provides fluid communication between the cylinder port 332 and the main passage 398. On the other hand, and in this representative embodiment, the main passage 398 extends transverse to the longitudinal axis A of the valve member 346 and provides fluid communication between the inlet portion 396 and the recess 368 formed in the valve head 362 of the valve member 346.

The air-assist passage 394 provides a source of pneumatic pressure from the pressurized cylinder port 332 that acts in combination with the biasing member 366 to operatively move the valve member 346 in a direction opposite to the movement induced by the actuator 314. Importantly, the air assist facilitates a faster acting valve. More specifically, a valve assembly 310 employing the air assist of the present invention may include a smaller biasing member 366 that generates less force than would be required without the air assist. Because the biasing member 366 generates less force, the actuator 314 has less force to overcome and therefore moves the valve member 346 to its first position faster. In this way, the biasing member 366, along with the air assist provided through the passage 394, will be able to quickly and efficiently move the valve member 346 away from its energized, position once the solenoid assembly 314 is de-energized. The air-assist passage 394 provides the necessary mechanical impetus to assist in moving the valve member 346 to the de-energized position. Thus, the directly operated valve assembly of the present invention overcomes the shortcoming and drawbacks of conventional valve assemblies when they are so reduced in size such that the biasing member 366 alone is of insufficient physical size and mechanical strength to repeatedly, quickly, and efficiently overcome the inertia of the valve member 346 and/or exceed the frictional adhesion forces acting between the valve member 346 and the valve bore 336. This allows a very fast acting valve assembly 310 to be constructed in sizes below the conventional standards.

Operation

The operation of the directly operated pneumatic valve having an air assist return of the present invention will now be described with reference to the three-way valve assembly 10 illustrated in FIGS. 1–3. However, those having ordinary skill in the art will appreciate that the explanation of the operation of the valve illustrated in FIGS. 1–3 also applies with respect to the four-way valve illustrated in FIGS. 4 and 5 as well as the three-way valve illustrated in FIG. 6 and any other directly operated pneumatic valve that employs the air assist return of the present invention.

In operation, pressurized air is supplied to the inlet port 30. The pressurized air flows past a filter 31 disposed in that port and into the valve bore 36. When the solenoid assembly 14 is de-energized, the biasing member 66 biases the valve member 46 to the left as viewed in FIG. 2 such that the valve element 54 is in sealing engagement with the valve seat 84. In this disposition, the valve element 56 is disposed spaced from the valve element 86 providing a flow passage between the cylinder port 32 and the valve bore 36. In this way, the cylinder port 32 is vented through the main valve bore 36 and the cylinder passages 64 and into the exhaust port 38.

On the other hand, when the solenoid assembly 14 is energized, it produces a force that drives the valve member 46 to the right as viewed in FIG. 3 and against the biasing force of the biasing member 66. In this operative disposition, the valve element 54 is moved off of the valve seat 84 and the valve element 56 is quickly moved into sealing engagement with the valve seat 86. Pressurized air is then allowed to flow through the inlet port 30, past the filter 31, into the valve bore 36, past the open valve element 54 and valve seat 84, and into the cylinder port 32. On the other hand, the interaction of the valve element 56 and valve element 86 seals the cylinder port 32 with respect to the exhaust port 38. In addition, the air assist passage 94 is open to the pressurized air flowing through the valve bore 36 and cylinder port 32. Thus, the recess 68 formed in the valve head 62 is similarly pressurized. However, the force generated by the solenoid assembly 14 is sufficient to overcome the oppositely directed force generated by this pressure.

Once the solenoid assembly 14 is de-energized and the actuating force is removed from the valve head 60 of the valve member 46, the biasing member 66 and the air pressure acting on the valve head 62 cooperatively start to move the valve member 46 back to its first position. As this occurs, the valve element 56 that formed a seal in the energized position with the valve seat 86 will quickly move off valve seat 86, so that the cylinder port 32 that was pressurized (and providing the air-assist pressure) vents through the exhaust port 38. The valve member 46 is then moved to the left until the valve element 54 seals with the valve seat 84 and fluid communication between the cylinder port 32 and the exhaust port 38 is established past the valve element 56 and the valve seat 86 through the valve bore 36. It should be noted that, once the valve member 46 is moving and any frictional or adhesion forces acting at the valve element 56 are overcome, the biasing member 66 has enough mechanical strength to continue to move the valve member 46 to its first de-energized position and the air-assist is no longer needed.

The air-assist passage provides a source of pneumatic pressure from the pressurized cylinder port that acts in combination with the biasing member to operatively move the valve member in a direction opposite to the movement induced by the actuator. Importantly, the air assist facilitates a faster acting valve. More specifically, valve assemblies employing the air assist of the present invention may include a smaller biasing member that generates less force than would be required without the air assist. Because the biasing member generates less force, the actuator has less force to overcome and therefore moves the valve member to its first position faster. The biasing member, along with the air assist provided through the passage, will be able to quickly and efficiently move the valve member away from its second, or energized, position once the solenoid assembly is de-energized. The air-assist passage provides the necessary mechanical impetus to assist in moving the valve member to the de-energized position. Thus, the directly operated valve assembly of the present invention overcomes the shortcoming and drawbacks of conventional valve assemblies when they are so reduced in size such that the biasing member alone is of insufficient physical size and mechanical strength to repeatedly, quickly, and efficiently overcome the inertia of the valve member and/or exceed the frictional adhesion forces acting between the valve member and the central bore.

The structure of the direct operated valve assembly 10, 210, and 310 of the present invention as described above has distinct advantages over the valves known in the related art. The valve assemblies 10, 210, and 310 are very fast acting. Further, the size limitations of convention valve assemblies are overcome and a range of smaller size valves become available. More specifically, the air-assist passage allows for a very fast acting valve assembly in a size much smaller than conventional designs. Thus, it is easily employed in environments where space is at a premium. The small size of the pneumatic valve of the present invention is facilitated by the air-assist passage providing a supplemental force of pressurized air to the biasing member. Furthermore, and from the foregoing description, those having ordinary skill in the art will readily appreciate that the air assist passage may be formed anywhere, either within the valve body, the valve member, partially exterior of the valve body, or any combination of these to provide a source of pneumatic pressure that acts in combination with the biasing member to operatively move the valve member in the direction opposite to the movement induced by the actuator.

Once again, from the foregoing description, those having ordinary skill in the art will appreciate that the present invention is not limited in any way to use in connection with a poppet valve. Rather, the present invention may be employed in connection with any other directly operated valve including, but not limited to, for example, spool valves, flat rubber poppet valves, flapper valves, pilot valves, or valve assemblies employed adjacent to or remote from the pneumatically actuated device.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A directly operated valve assembly comprising:
a valve body having a pressurized air supply inlet port in communication with a source of pressurized air, and at least one cylinder port;
a valve bore extending axially within said valve body;
a valve member supported within said valve bore and movable between predetermined positions within said valve bore to selectively direct pressurized air from said inlet port through said at least one cylinder port;
an actuator mounted to said valve body for moving said valve member in a first direction and a biasing member disposed between said valve member and said valve body adapted to providing a biasing force to said valve member in an opposite direction; and
an air-assist passage providing a source of pneumatic pressure that acts in combination with said biasing member to operatively move said valve member in a direction opposite to the movement induced by said actuator.

2. A directly operated valve assembly as set forth in claim 1 wherein said valve member includes a pair of opposed valve heads, at least one of said opposed valve heads including a recess, said biasing member operatively disposed within said recess between said valve member and said valve body.

3. A directly operated valve assembly as set forth in claim 2 wherein said air-assist passage is formed within said valve member and extends between said at least one cylinder port and said recess in said at least one opposed valve head of said valve member to provide selective fluid communication between said source of pressurized air and said recess.

4. A directly operated valve assembly as set forth in claim 3 wherein said air assist passage includes an inlet portion and a main passage, said inlet portion extending radially relative to the center line A of the valve member and providing fluid communication with said at least one cylinder port, and said main passage providing fluid communication between said inlet port and said recess.

5. A directly operated valve assembly as set forth in claim 4 wherein said main passage extends coaxially within said valve member relative to the longitudinal axis of the valve member.

6. A directly operated valve assembly as set forth in claim 4 wherein said inlet portion is formed between a pair of valve elements formed on said valve member.

7. A directly operated valve assembly as set forth in claim 2 wherein said air assist passage is formed within said valve body and extends between said at least one cylinder port and said recess in said valve head of said valve member to provide selective fluid communication between said source of pressurized air and said recess.

8. A directly operated valve assembly as set forth in claim 7 wherein said air assist passage includes an inlet portion and a main passage, said inlet portion extending axially within said valve body relative to the movement of said valve member within said valve bore and provides fluid communication between said at least one cylinder port and said main passage, said main passage extending traversely relative to the longitudinal axis A of said valve member and provides fluid communication between said inlet portion and said recess formed in said valve head of said valve member.

9. A directly operated valve assembly as set forth in claim 2 wherein said biasing member includes a coiled spring.

10. A directly operated valve assembly as set forth in claim 1 wherein said valve body includes at least one exhaust port, said valve member further operable to direct pressurized air from said at least one cylinder port through said valve bore and out said at least one exhaust port.

11. A directly operated valve assembly as set forth in claim 1 wherein said valve bore extends through said valve body to present a pair of open ends and said assembly further includes a pair of retainer assemblies threadably received in said pair of open ends of valve body to close same.

12. A directly operated valve assembly as set forth in claim 11 wherein each of said pair of retainer assemblies defines an innermost terminal end, said valve member defining a poppet valve having a pair of opposed annular valve heads disposed at either end of said poppet valve, each of said pair of opposed valve heads defining an outer diameter moveably received in sealing engagement with said innermost terminal ends of said pair of retainer assemblies.

13. A directly operated valve assembly as set forth in claim 11 wherein each of said retainer assemblies presents a plurality of valve seats adjustably positioned within said valve bore to define the predetermined positions between which said valve member moves within said valve bore.

14. A directly operated valve assembly as set forth in claim 13 wherein each of said pair of retainer assemblies includes a valve seat portion adjustably disposed within said valve body having a plurality of cylinder passages defined in each of said valve seat portions.

15. A directly operated valve assembly as set forth in claim 14 wherein each of said valve seat portions presents at least one of said plurality of valve seats.

16. A directly operated valve assembly as set forth in claim 13 wherein said valve member includes a plurality of valve elements defined along its length, said valve elements cooperating with said plurality of valve seats to direct fluid from said valve bore through said at least one cylinder port.

17. A directly operated valve assembly as set forth in claim 1 wherein said valve body includes a pair of cylinder ports and a pair of exhaust ports each in fluid communication with said valve bore, said valve bore including a plurality of valve seats, said valve member includes a plurality of valve elements defined along its length, said valve elements cooperating with said seats to direct fluid from said valve bore through various ones of said pair of cylinder ports and said pair of exhaust ports.

18. A directly operated valve assembly comprising:
a valve body having a pressurized air supply inlet port in communication with a source of pressurized air and at least one cylinder port;
a valve bore extending axially within said valve body;
a valve member having a distal end and a proximate end, and a pair of opposed valve heads each disposed at one of said ends of said valve member, said valve member slidingly disposed within said valve bore and movable between predetermined first and second positions within said valve bore to selectively direct pressurized air from said inlet port through said at least one cylinder port;
an actuator disposed upon said valve body at said proximate end of said valve member for moving said valve member in one direction from said first to said second position;
a biasing member disposed at the said distal end of said valve member between said valve member and said valve body adapted to providing a biasing force to said valve member; and
an air-assist passage disposed within said valve member providing fluid communication between said distal end of said valve member and the source of pressurized air such that pneumatic pressure acts in combination with said biasing member to operatively move said valve member in a direction opposite to the movement produced by said actuator and from said second to said first position.

19. A directly operated valve assembly as set forth in claim 18 wherein at least one of said opposed valve heads includes a recess, said air assist passage includes an inlet portion and a main passage, said inlet portion extending radially relative to the center line A of said valve member and providing fluid communication with said at least one cylinder port, and said main passage providing fluid communication between said inlet portion and said recess.

20. A directly operated valve assembly as set forth in claim 19 wherein said main passage extends coaxially within said valve member relative to the longitudinal axis of the valve member.

21. A directly operated valve assembly as set forth in claim 19 wherein said inlet portion is formed between a pair of valve elements formed on said valve member.

22. A directly operated valve assembly comprising:
a valve body having a pressurized air supply inlet port in communication with a source of pressurized air and at least one cylinder port;
a valve bore extending axially within said valve body;
a valve member having a pair of opposed valve heads slidingly disposed within said valve bore and movable between predetermined first and second positions within said valve bore to selectively direct pressurized air from said inlet port through said at least one cylinder port;
an actuator disposed upon said valve body at one end of said valve member for moving said valve member in one direction from said first to said second position;
a biasing member disposed at the other end of said valve member between said valve member and said valve body adapted to providing a biasing force to said valve member; and
an air assist passage formed within said valve body and extending between said at least one cylinder port and one of said pair of opposed valve heads to provide selective fluid communication between said source of pressurized air and said valve head.

23. A directly operated valve assembly as set forth in claim 22 wherein said valve member includes a recess formed in at least one valve head, said air assist passage includes an inlet portion and a main passage, said inlet portion extending axially within said valve body relative to the movement of said valve member within said valve bore and provides fluid communication between said at least one cylinder port and said main passage, said main passage extending traversely relative to the longitudinal axis of said valve member and provides fluid communication between said inlet portion and said recess formed in said valve head of said valve member.

* * * * *

UNITED STATES PATENT AND TRADEMARK OFFICE
CERTIFICATE OF CORRECTION

PATENT NO. : 6,772,791 B2
DATED : August 10, 2004
INVENTOR(S) : Robert Neff

Page 1 of 1

It is certified that error appears in the above-identified patent and that said Letters Patent is hereby corrected as shown below:

Column 5,
Line 37, "maybe" should be -- may be --;

Column 8,
Line 12, "maybe" should be -- may be --;

Column 9,
Line 9, after "that" insert -- are --;

Column 11,
Line 16, "away" should be -- a way --;

Column 14,
Line 13, "convention" should be -- conventional --;
Line 61, "providing" should be -- provide --;

Column 16,
Line 43, "providing" should be -- provide --;

Column 17,
Line 18, "providing" should be -- provide --.

Signed and Sealed this

First Day of March, 2005

JON W. DUDAS
*Director of the United States Patent and Trademark Office*